United States Patent [19]
Walser

[11] 3,812,630
[45] May 28, 1974

[54] METHOD FOR ADJUSTING MACHINE TOOLS AND CONTROLLING THE MACHINING OPERATION

[75] Inventor: Alberto Walser, Zollikon, Switzerland

[73] Assignee: Albert Walser Prazisionsmechanik & Werkzeugbau, Zollikon, Switzerland

[22] Filed: Jan. 17, 1972

[21] Appl. No.: 218,444

[30] Foreign Application Priority Data
Jan. 21, 1971  Switzerland........................ 907/71

[52] U.S. Cl. ............................ 51/281 R, 51/165.72
[51] Int. Cl. .............................................. B24b 3/34
[58] Field of Search........... 356/142, 143; 51/165 R, 51/165.72, 281 R

[56] References Cited
UNITED STATES PATENTS
2,484,103  10/1949  Lewis................................ 356/164
3,015,914  7/1962  Roney.......................... 51/165.72 X
3,082,581  3/1963  Vadeboncoeur................. 51/165.72

Primary Examiner—Harold D. Whitehead
Attorney, Agent, or Firm—Werner W. Kleeman

[57] ABSTRACT

A method of and apparatus for adjusting the substantially cylindrical cutting surface of a machining tool at a machine tool in a predetermined angle at the point of intersection between a substantially cylindrical surface and a reference surface of the workpiece to be machined, especially a cutting tool, and controlling this angle at the workpiece to be machined with the aid of an optical system, wherein for the control and/or adjustment of such angle the optical axis of the optical system at a carriage also carrying the spindle for the machining tool is displaced such that such optical axis assumes a position corresponding to the working position of the spindle axis. Thus the common carriage for the optical system and spindle and a carriage carrying the clamping mechanism for the workpiece are adjusted relative to one another in two directions perpendicular to one another to such an extent until a reference surface of the workpiece extends substantially parallel to a line of a crosshair of the optical system and the cylindrical surface of the workpiece to be produced coincides with a centering circle of the optical system, which centering circle is analogous to the diameter of the cylindrical cutting surface of the machining tool so that the apex of the angle to be controlled is disposed along a radial line of the centering circle, the angle of which with regard to an adjacent line of the crosshair corresponds to the angle to be controlled and/or adjusted. And after carrying out the control and/or adjustment the spindle is retracted back into its work position.

2 Claims, 4 Drawing Figures 3,812,630

METHOD FOR ADJUSTING MACHINE TOOLS AND CONTROLLING THE MACHINING OPERATION

BACKGROUND OF THE INVENTION

The present invention relates to a new and improved method for the adjustment of machine tools and for controlling the machining operation and also deals with a new and improved optical system suitable for the performance of the aforesaid inventive method.

It is known for machine tools to undertake adjustment of the machining tool relative to the workpiece and to control such machining operation with the aid of an optical system. To this end, a microscope together with a spindle carrying the machining tool is displaceably mounted upon a common adjustment carriage or slide. The microscope and spindle are fixedly connected with one another such that their axes extend parallel to one another. If thereafter the microscope is initially displaced into a position corresponding to the working position of the spindle axis and while observing the workpiece in the microscope, the workpiece is aligned relative to the optical axis of the microscope, then it is also aligned with respect to the machine spindle and the machining tool when, following retraction of the microscope, the machine spindle again assumes its working position.

SUMMARY OF THE INVENTION

It is a primary objective of the present invention to provide a novel method of adjusting machine tools and controlling the machining operation as well as the provision of a novel optical system for the performance of the aforesaid method, by means of which it is possible to carry out in a simple and time-saving manner a particularly exact adjustment and control of the machining operation at the machine tool where workpieces are machined while exactly maintaining a fixed angle between the surface to be machined and a reference surface.

Now, in order to implement these and still further objects of the present invention, which will become more readily apparent as the description proceeds, the inventive method for the adjustment of a substantially cylindrical cutting surface of a machining tool, especially a grinder pin at a machine tool, in a prescribed angle at the intersect point between the cylindrical surface and a reference surface of the workpiece to be machined, especially a steel cutting tool, and for controlling this angle at the workpiece to be machined with the aid of an optical system, contemplates that for the purpose of controlling and/or adjusting such angle the optical axis of the optical system is displaced upon a carriage common to a spindle carrying the machine tool into a position corresponding to the working position of the spindle. The common carriage and the carriage carrying the clamping mechanism with the workpiece are adjusted relative to one another in two perpendicular directions to such an extent until the reference surface of the workpiece extends parallel to a line of a crosshair of the optical system and the machined or cylindrical surface of the workpiece which is to be produced coincides with a centering circle of the optical system which corresponds to the diameter of the cylindrical machining tool, so that the apex of the angle to be controlled is located upon a radius of the centering circle, the angle of which with regard to the next situated line of the cross-hair corresponds to the angle which is to be controlled and/or adjusted, and after carrying out the control and/or adjustment the spindle is then retracted back into its working position.

Apart from the aforementioned method aspects of this development, the invention also concerns a new and improved construction of optical system suitable for the performance of the aforesaid inventive method and which is equipped with means for its displacement between a geometrically defined control- or adjustment position and a rest position upon a machine carriage common to the spindle carrying the machining tool. There is also provided for the optical system a crosshair which is visible within a field of view and having two crosshair lines which extend perpendicular to one another and centering circles extending concentrically to the point of intersection of these cross-hair lines and the optical system axis. The centering circles are provided with markings for indicating the corresponding diameter of a cutting tool employed in the machine tool and marking lines extending radially with regard to the centering circles, these marking lines having indicator markings for indicating the angular arc between a line of the crosshair perpendicular to the reference line and the momentarily relevant radially extending marking line. When the optical system is adjusted, a reference surface of the workpiece to be controlled extends parallel to such reference line.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
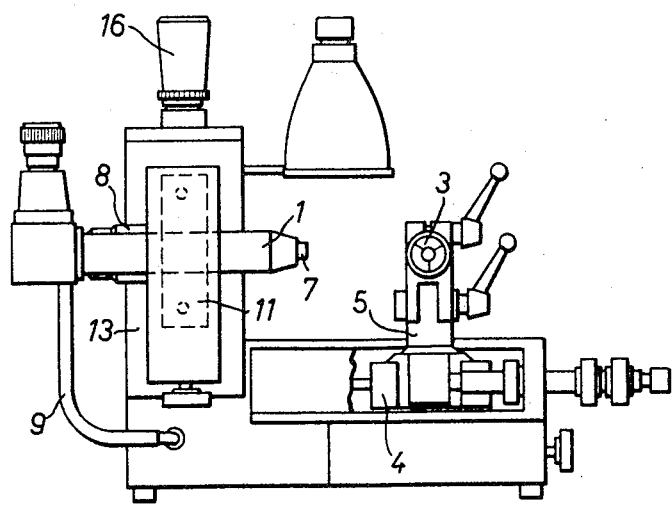
FIG. 1 is a schematic side view of a machine tool, for instance a grinder, equipped with the inventive optical system and used for carrying out the inventive method.
Figure 2:
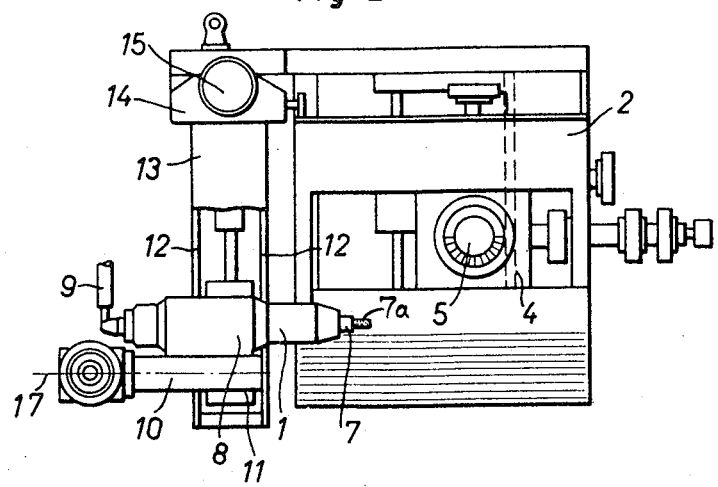
FIG. 2 is a plan view of the arrangement depicted in FIG. 1.

Describing now the drawings, in FIGS. 1 and 2 there is illustrated a machine tool, for instance a grinding machine, having a carriage or slide 2 which is adjustable transversely to the axis of the machine spindle 1. Upon the carriage 2 there is arranged the clamping mechanism 3 for the workpiece which is to be machined e.g., ground and which has not been particularly illustrated in these Figures. The grinding stroke during grinding can be manually carried out by moving to-and-fro the support or carrier component 4 of the clamping mechanism 3 guided at the carriage 2. The stroke movement takes place parallel to the axis of the machine spindle 1. The clamping mechanism 3 is rotatable about a vertically extending shaft 5 and can be fixedly adjusted, so that for grinding a turning tool 6, as such has been indicated in FIG. 3, the axis of the tool extends from the clamping mechanism 3 at an inclination in the direction of the tool clamping chuck 7 at the end of the machine spindle 1.

The machine spindle 1 together with a turbine driven by compressed air is enclosed within a spindle housing 8. The infeed of compressed air can be carried out through the agency of a flexible hose 9 or equivalent structure. The employed microscope 1o possesses, for instance, a 15-fold magnification and is secured together with the spindle housing 8 and the machine spindle 1 at a common slide body 11. This slide body 11 is displaceable in guide slots 12 of a hollow body 13 between a work or working position of the spindle 1 represented in FIG. 2 and a control position. This hollow body 13 is located at a vertical carriage 14 which can be adjusted by means of a spindle 15 by rotating the handgrip 16 together with such hollow body and therefore the machine spindle 1 and the microscope 10 is adjustable.

At the clamping chuck 7 there is employed, for instance, a ceramic or diamond grinding pin 7a of 0.8 – 10 mm. diameter, so that owing to the high rotational speeds of 50,000–85,000 r.p.m. of the drive turbine there is produced a ground surface of extremely high quality. The grinding machine is therefore particularly suitable for finish grinding of, for instance, boring tools, corner tools, recessing tools, chipping tools, pointed threading tools, trapezoid tools and square threading tools, and Seeger ring-groove tools. The rake angle or side rake of such cutting tools which is to be ground therefore is between 0° and 40°. Exactly maintaining such rake angle is of considerable importance for the longevity of a cutting tool and thus the degree of wear of the very expensive and complicated machines, such as for instance jig drills, with which such cutting tools can be employed for instance. It should be apparent that with the heretofore conventional machining operations, in particular grinding performed by sight judgment an exact finish grinding of the side rake was not possible.

Figure 3:
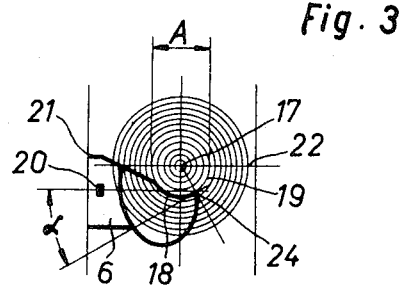
FIG. 3 is a schematic representation of the picture visible in the image field of the microscope of the grinding machine with the workpiece.
Figure 4:
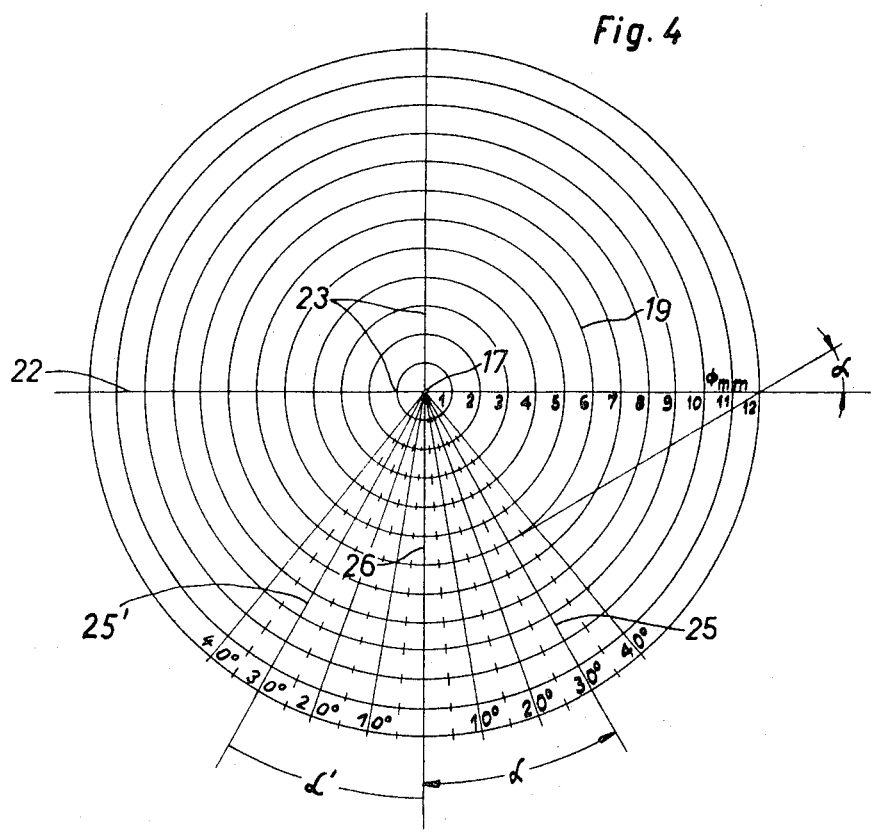
FIG. 4 is an enlarged view of the reference line system which appears in the image or viewing field of the microscope.

For the exact control and adjustment of the angle to be ground or machined between two surfaces at the workpiece, there is provided the microscope 10 with the reference line system illustrated in FIGS. 3 and 4. If the machine spinlde 1 is displaced together with the non-illustrated grinding pin out of the spindle work or working position depicted in FIG. 2 until reaching a stop, then, the microscope 10 arrives at the working position previously assumed by the spindle. The optical axis 17 of the microscope 10 now assumes the previous position of the spindle axis. By rotating the handgrip 16 of the spindle 15 of the vertical carriage 14 and by adjusting the transverse carriage or slide 2, which carries the cutting or turning tool 6 which is to be ground, and if desired by rotating the clamping mechanism 3 about its shaft 5, the part of the turning tool 6 which is to be machined can be brought into the position depicted in FIG. 3. As a result, the cylindrical surface 18 to be machined is brought into coincidence with a centering circle 19, the diameter of which, while taking into account the magnification of the microscope, corresponds to the diameter of the grinding pin 7a. If at the same time the axis 20 or a reference surface 21 of the tool 6 also extends parallel to a cross-hair line or reference line 23 of tyhe crosshair 23 consisting of for instance the two lines 22 and 23 which extend perpendicular to one another, then the apex 24 of the angle α to be controlled or adjusted is disposed between the surface 18 to be machined and the reference surface 21 along a radial line or radius 25 which encloses with the next situated line 26 of the crosshair 23 the same angle α. Consequently, the rake angle α can be directly read-out at the microscope 10 of the machine tool, or from the reference line system there can be determined the required adjustment of the workpiece to be machined with respect to the machining tool for maintaining or realizing a predetermined angle α.

In the illustration of FIG. 3, the right-hand cutting or turning tool 6 to be ground extends in the clamping mechanism 3 and alos correspondingly in the image field or viewing field of the microscope from the left towards the right.

When grinding a left-hand cutting or turning tool, such, in comparison to the position of FIG. 3, is arranged in mirror-image fashion and then the decisive radial marking lines 25' are located in the image field according to FIG. 4 at the left side of the crosshair 23.

While there is shown and described present preferred embodiments of the invention, it is to be distinctly understood that the invention is not limited thereto but may be otherwise variously embodied and practiced within the scope of the following claims.

Accordingly, what is claimed is:

1. A method for adjusting the substantially cylindrical cutting surface of a machining tool, especially a grinding pin, at a machine tool in a predetermined angle at the point of intersection between a cylindrical surface and a reference surface of the workpiece to be machined, especially a cutting tool, and controlling this angle at the workpiece to be machined with the aid of an optical system, wherein for the control and/or adjustment of such angle there is carried out the steps of: displacing the optical axis of the optical system at a carriage also carrying the spindle for the machine tool until such optical axis assumes a position corresponding to the work position of the spindle axis, then adjusting relative to one another the common carriage for the optical system and spindle and a carriage carrying the clamping mechanism for the workpiece in two directions perpendicular to one another until a reference surface of the workpiece extends substantially parallel to a line of a cross-hair of the optical system and the cylindrical surface of the workpiece to be produced coincides with a centering circle of the optical system, which centering circle is analogous to the diameter of the cylindrical cutting surface of the machine tool, so that the apex of the angle to be controlled is disposed along a radial line of the centering circle, the angle of which radial line with regard to the next situated line of the crosshair corresponds to the angle to be controlled and/or adjusted, reading such angle and employing the read angle for the control and/or adjustment operation, and retracting the spindle back into its work position after carrying out the control and/or adjustment operation.

2. A method for adjusting the substantially cylindrical surface of a cutting tool at a machine tool in a predetermined angle at the point of intersection between a given surface and a reference surface of a workpiece to be machined, and controlling this angle at the workpiece with the aid of an optical system, wherein for the control and/or adjustment of such angle there is carried out the steps of: displacing the optical axis of the optical system for the machining tool such that such optical axis assumes a position corresponding to the work position of a spindle axis, then adjusting the optical system and the workpiece relative to one another to such an extent until a reference surface of the workpiece extends substantially parallel to a line of a crosshair of the optical system and the given surface of the workpiece to be produced coincides with a centering circle of the optical system, which centering circle substantially corresponds to the diameter of the cylindrical surface of the cutting tool and the apex of the angle to be controlled is disposed along a radial line of the centering circle, the angle of which with regard to the next situated line of the crosshair corresponds to the angle to be controlled, reading such angle and employing the read angle for carrying out the control and/or adjustment operation, and retracting the spindle axis back into its work position after having carried out the control and/or adjustment operation.

* * * * *